United States Patent [19]

Simpson et al.

[11] Patent Number: 4,538,991
[45] Date of Patent: Sep. 3, 1985

[54] TARGET APPARATUS FOR WEAPON FIRE TRAINING

[75] Inventors: Anthony Simpson, Godalming; Stuart M. Peterkin, Effingham; Brian T. Brooksby, Redhill; Harold J. Murray, Alton, all of England

[73] Assignee: Detras Training Aids Limited, Hampshire, England

[21] Appl. No.: 257,790

[22] Filed: Apr. 27, 1981

[30] Foreign Application Priority Data

May 1, 1980 [GB] United Kingdom ............... 8014486

[51] Int. Cl.³ .............................................. G09B 9/00
[52] U.S. Cl. ...................................... 434/12; 434/21; 434/44; 434/20; 273/313
[58] Field of Search ................... 273/310–312, 273/313–316; 434/16, 19, 20, 21, 22, 29, 43, 44, 12, 284, 285, 286; 353/62; 350/125

[56] References Cited

U.S. PATENT DOCUMENTS

| | | | |
|---|---|---|---|
| 2,418,512 | 4/1947 | Johnson | 434/21 |
| 2,483,216 | 9/1949 | Marshall | 434/286 |
| 2,502,834 | 4/1950 | Dreyer | 273/316 |
| 3,507,055 | 4/1970 | Claunch et al. | 434/14 |
| 3,560,644 | 2/1971 | Petrocelli | 358/104 |
| 3,588,237 | 6/1971 | Aldrich | 434/20 |
| 3,596,375 | 8/1971 | Hervieu | 434/29 |
| 3,612,761 | 10/1971 | Wolff | 358/104 |
| 3,938,262 | 2/1976 | Dye et al. | 434/21 |
| 3,964,178 | 6/1976 | Marshall et al. | 434/20 |
| 4,019,262 | 4/1977 | Breglia et al. | 434/21 |
| 4,178,701 | 12/1979 | Sadler | 434/286 |
| 4,276,028 | 6/1981 | Gwynn | 434/20 |
| 4,315,689 | 2/1982 | Goda | 434/22 |

FOREIGN PATENT DOCUMENTS

707877 4/1954 United Kingdom ................. 434/20

Primary Examiner—Richard C. Pinkham
Assistant Examiner—Leo P. Picard

[57] ABSTRACT

Target apparatus for use in the training of weapon direct fire, including a structure (1) in which a weapon can be placed and which forms a screen (3) of concave truncated spherical shape, at least one target image projector (4) located within the structure (1) for projecting a target image (T) onto the screen (3), with the projector (4) being mounted for universal movement so as to be capable of moving the projected target image (T) over the screen (3), and a visible laser projector (8) located on or adjacent the weapon to produce a visual indication (P) on the screen (3) by a projected beam of visible light, of at least a final portion of the flight path of the simulated fired projectile or missile, corresponding to the position at which the weapon was aimed when fired, for a projectile or missile whose trajectory or flight path cannot be controllably varied after firing, or corresponding to the position at which the weapon was aimed when fired and as subsequently controllably varied, for a projectile or missile whose trajectory or flight path can be controllably varied after firing. The target image projector (4) is located in the structure at the center of curvature of the concave truncated spherical shaped screen (3). An infra-red projector (9) may be included to project a beam of radiation along the line of sight of the weapon together with a detector (10) for this beam. The projector (8) may be operable to indicate visually on the screen (3) the impact of a missile or sequence of projectiles on the target image (T) and/or the whole of the flight path of the missile or projectile.

33 Claims, 4 Drawing Figures

TARGET APPARATUS FOR WEAPON FIRE TRAINING

FIELD OF THE INVENTION

This invention relates to a target apparatus for use in the training of weapon direct fire, such as gunnery and missile launchers, and particularly, but not exclusively for use in the training of anti-aircraft and naval gunnery and missile launchers.

BACKGROUND OF THE INVENTION AND PRIOR ART

In action anti-aircraft and naval gunners or missile launchers have to be able to engage targets such as aircraft which approach from any bearing around 360° to horizon and at any elevation over an arc of 180°. In order to avoid the use of expensive targets, missiles and gun shells it has been conventional to train gunners or missile launchers in simulated attack conditions using target/gun and target/missile launcher simulators.

Conventional target apparatus for use in such training, has either a structure forming a hemispherical screen mounted on a cylindrical wall or a structure forming a screen of concave truncated spherical shape, in which structure a weapon can be placed. A fixed film projector is located within the structure to project a target image onto the screen provided by the structure interior, via one or more mirrors movable in response to a system of cams and wires or a system of servo-motors. Movement of the mirrors by the cams and control wires or servo-motor system provides movement over the screen of the target image projected by the fixed film projector.

Means are provided for predetermining, or calculating, and positioning on the screen a target image future position point along the flightpath of the target image in order to define the correct point of aim at each position of the target image on the screen. Customarily this is done by projection of an infra red beam of radiation onto the screen from a position adjacent the fixed film projector together with the provision on the weapon of an infra-red detector so that when the weapon sight is correctly aligned with the target image future position spot on the screen and the weapon trigger activated, a hit on the target image is recorded.

Such conventional target apparatus has three serious disadvantages. The first disadvantage is that the use of a fixed film projector, movable mirror or mirrors, cams and control wires or servo-motor systems with a hemispherical screen mounted on a cylindrical wall produces a target apparatus which cannot provide a target image at bearings around more than 200° of horizon and at elevations of more than 108° of arc. Similarly the use of a fixed film projector, movable mirror or mirrors, a system of cams and wires or a system of servo-motors with a structure forming a screen of concave truncated spherical shape produces a target apparatus which cannot provide a target image around more than 266° of horizon and over an elevation of more than 108° of arc. This is a particularly severe disadvantage as it does not enable conventional target apparatus to provide realistic training conditions necessary to engage and destroy targets approaching at bearings and elevations falling within the area of the dead sector necessarily produced by these conventional forms of target apparatus. Conventionally the weapon is placed in the dead sector in such structures.

The second disadvantage is that such conventional target apparatus are only able to provide in the same scene a single target image or multiple target images which always move as one, and this cannot provide effective training to cope with the modern ground attack aircraft tactics of flying in pairs with one aircraft approaching the target area from one direction to engage ground defences while the other completes the attack run from another direction. Similar tactics are also employed by modern naval fast patrol/missile launch vessels.

The third disadvantage is that by the use of an infra-red target image future position projector on or near the target image projector and an associated infra-red detector on the weapon sight it was difficult and complicated to provide anything other than a target hit or a target miss indication. No miss distance indication was provided if the weapon was not aimed correctly when the trigger was activated and indeed no indication could be given of the projectile flightpath position on the screen.

A target apparatus has been proposed by the present applicants which includes a structure forming a screen of concave truncated spherical shape in which a weapon can be placed, at least one target image projector mounted for universal movement within the structure for projecting a target image onto the screen, an infra-red projector for projecting a beam of radiation onto the screen at a selected position relative to the projected target image, which selected position corresponds to the position at which the weapon should be aimed to produce a hit on the target image when fired, an infra-red detector means movable with the weapon for registering a hit or miss by detecting whether or not the weapon is aimed at the selected position when fired and a laser projector mounted with the target image projector and the infra-red projector for selective operation to provide a visual indication on the screen only of the selected position produced by the projected infra-red radiation beam. Optionally with this proposed target apparatus there may be more than one target image projector.

Although the foregoing proposed target apparatus alleviates the first disadvantage by the provision of a universally movable target image projector and alleviates the second disadvantage by the provision on a vertical line through the center of curvature of the concave truncated spherical shape screen of one or more universally movable target image projectors it does not alleviate the third disadvantage.

OBJECT OF THE INVENTION

An object of the invention is to provide a further improved target apparatus capable of providing more realistic training conditions.

Another object of the invention is to provide a target apparatus which can provide a target image at bearings around more than 200° of horizon, preferably more than 266° of horizon, and at elevations of more than 108° of arc.

A further object of this invention is to provide more than one independently controllable target image at a time on target apparatus.

Yet another object of the invention is to provide a target apparatus which can indicate miss distance of a mis-aimed round from the target image and which can indicate a projectile flightpath position on the screen carrying the or each target image.

SUMMARY OF THE INVENTION

According to the present invention there is provided target apparatus for use in the training of weapon direct fire, including a structure in which a weapon can be placed and which forms a screen of concave truncated spherical shape, at least one target image projector located within the structure for projecting a target image onto the screen, with the at least one projector being mounted for universal movement so as to be capable of moving the projected target image over the screen, and a visible light projector located on or adjacent the target image projector and operable by a firing activation of the weapon to produce a visual indication on the screen, by a projected beam of visible light, of at least a final portion of the flight path of the simulated fired projectile or missile, corresponding to the position at which the weapon was aimed when fired, for a projectile or missile whose trajectory or flight path cannot be controllably varied after firing, or corresponding to the position at which the weapon was aimed when fired and as subsequently controllably varied, for a projectile or missile whose trajectory or flight path can be controllably varied after firing.

Preferably, the at least one target image projector is located in the structure at the centre of curvature of the concave truncated spherical shaped screen. Advantageously the target image projector is mounted for universal movement on a gimballed mounting providing two axis freedom of movement. The gimballed mounting may be on a gantry fixed with respect to the structure or on a gantry rotatable in unison with a weapon when the latter is present in the structure and operatively traversed. The target image projector may be a film or T.V. video projector and there may be a plurality of target image projectors mounted preferably on a vertical axis through the centre of curvature of the concave truncated spherical shape screen.

Preferably the visible light projector is a laser projector. This laser projector may be mounted with the target image projector on the gimballed mounting. Additionally the visible light projector may be operated to indicate the whole of the projectile or missile flight path from firing to a hit, miss, or self destruct situation.

The target apparatus of the invention may include means for projecting a beam of radiation normally invisible to the naked eye, preferably an infra-red projector, locatable and operable to project a beam of radiation directly along the weapon line of sight (LOS) to form an invisible LOS spot on the screen. A detector for this beam of radiation, preferably an infra-red detector, may be located adjacent the target image projector on or separate from the visible light projector to permit movement of the detector independent of the target image projector, and operable to track the line of sight point of the weapon on the screen. Additionally a miss distance detector may be located on the target image projector to provide an angular measurement of deviation of the visible light spot on the screen from the target image centre on the screen.

In target apparatus according to one embodiment of the invention applicable to a weapon in the form of a gun firing a projectile or a sequence of projectiles whose trajectory or trajectories cannot be controllably varied after firing, the visible light projector, preferably a laser projector, may be operated to indicate visibly the whole flight path of selected projectiles in a sequence of projectiles, thus simulating tracer fire. Additionally or alternatively in this embodiment the visible light projector may be operated via a controllably movable mirror to indicate visibly the impact of a sequence or burst of projectiles on a target image. Advantageously a target hit flash projector is included, preferably mounted on the visible light projector and operable to indicate visually on the screen by a beam of projected visible light, a series of hits on the target image. The target hit flash projector preferably is connected to the target image projector in a manner such as to cause the latter to switch off when a series of hits are registered, thereby indicating destruction of the target.

In target apparatus according to another aspect of the invention applicable to a weapon in the form of a missile launcher firing a missile whose trajectory cannot be controllably varied by the operator after firing, such as a heat seeking missile, a heat projector, preferably a high powered infra-red projector, is mounted on the target image projector to project a beam of infra-red radiation coincidentally on to the target image on the screen to simulate target engine heat emission. Preferably the intensity of the infra-red heat beam is continuously variable in accordance with the target image range and aspect. In said another embodiment the visible light projector, preferably a laser projector, is operable to project the whole flight path of the missile. A target flash projector preferably is associated with the target image projector to project a beam coincident with the projected target image to produce a flash on the target image on the screen to indicate a hit on the target image. This target image flash projector is connected to the target image projector in a manner such that simultaneously with the hit flash the target image projector is switched off to indicate destruction of the target. To indicate a missile self-destruction, the visible light beam spot on the screen may be made to expand and switch off.

In target apparatus according to a further aspect of the invention applicable to a weapon in the form of a missile launcher firing a missile whose trajectory can be controllably varied by the operator after firing, such as wire-controlled optically guided missile, the visible light projector, preferably a laser projector, may be arranged to be switched on at the moment of firing and indicate visibly the whole flight path and controlled response of a missile as guided by the operator.

Other objects and features of the invention will become apparent from the following detailed description of preferred but non-limitative embodiments and the accompanying drawings made a part hereof and to which reference is made.

Figure 1:
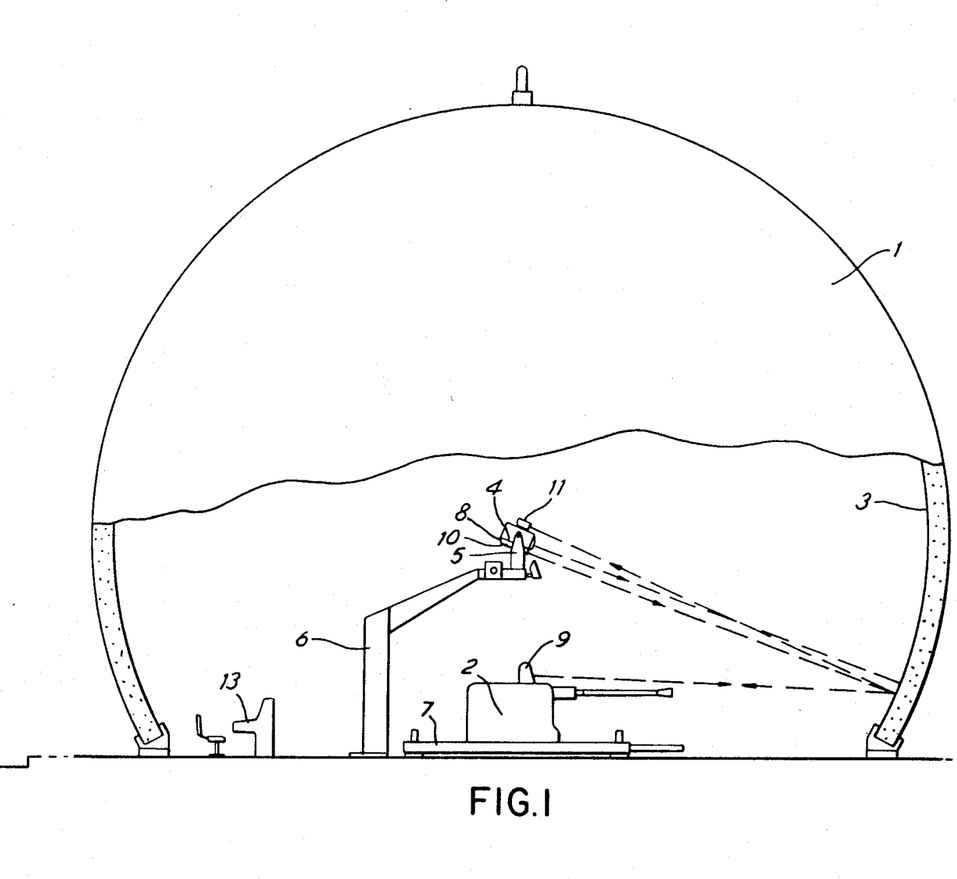
FIG. 1 is a diagrammatic side view of target apparatus according to a first embodiment of the invention, partially broken away to reveal part of the interior of a structure of the apparatus.

As shown in FIG. 1 of the accompanying drawings, a target apparatus according to a first or basic embodiment of the invention for use in the training of weapon direct fire includes a structure 1 in which a weapon 2 can be placed. This structure 1 is of sufficient area and size to permit more than one weapon such as different calibre A.A. guns to be positioned inside and forms a screen 3 of concave truncated spherical shape. The structure 1 can be an outdoor installation made, for example, of reinforced concrete, glass fibre reinforced plastics or interlocking rigid plastics sections of regular polygon shape. Alternatively the structure 1 may be an indoor installation made, for example, of interlocking rigid plastics sections of regular polygon shape. The precise internal diameter tolerances required for the screen 3 and the need for a perfectly smooth, multi-curvatured inner surface are automatically ensured during the manufacture of each plastics section.

The structure 1 may be provided with a movable construction gantry (not shown) rotatable about the center of the structure to permit each plastic section to be raised by one man with a small powered hoist to a second man who locks each plastic section into place. When the structure 1 has been erected the outer surface may be weatherproofed in any convenient manner such as by a resilient paint while the inner surface which provides the screen 3 can be painted or otherwise treated as necessary to provide the requisite reflective screen surface. A movable section of the structure 1 may be provided to constitute a door which is removable to allow entrance and exit of weapons into and out of the structure 1. Additionally the structure may be air-conditioned by air-conditioning and ventilation units and a cloud projector can be provided for projecting background cloud outlines and shapes across the screen 3.

At least one target image projector 4, preferably a high power T.V. video projector, is located within the structure 1 for projecting a target image onto the screen 3 at any point thereon. To this end the target image projector 4 is mounted for universal movement in any convenient manner such as a gimballed mounting 5 providing two axis freedom of movement.

This gimballed mounting 5 can be mounted in any convenient way in the structure such as on a gantry 6 fixed with respect to the structure 1 as shown in FIG. 1. Alternatively the gimballed mounting 5 can be mounted on a gantry which is rotatable in unison with a weapon such as an anti-aircraft gun when the latter is traversed. To this end the movable gantry may be secured to a rotatable platform to which the mounting of the gun is secured so that the rotatable platform and gun rotate in unison when the gun is traversed. Alternatively the gimballed mounting 5 can be mounted on an alternative movable gantry which is directly attached to the gun platform of the gun for rotational movement therewith when the gun is traversed.

In this way the target image projector can be given universal movement to enable a target image to be projected onto any desired position on the screen 3 at a bearing around 360° of horizon and at an elevation of at least 180° of arc. By choice of the degree of truncation of the structure 1 and depending upon the degree of depression which the gun is capable of, it is possible to achieve an elevation or depression below the horizontal down to, for example, minus 10°. This is particularly useful for use in training naval gunners or tank gunners. Moreover, by preferably positioning the target image projector 4 at the center of curvature of the concave truncated spherical shape screen 3 it is possible to ensure correct focussing and definition of the target image at any position of the screen.

Although the fixed gantry 6 shown in FIG. 1 may provide a blind spot to the operator of the gun 2, this masking effect is minimal and acceptable for situations in which the gun, in use, normally encounters a degree of masking such as for a naval gun which is masked by the vessel's superstructure over some bearings. However, the movable gantry hereinbefore described does not obstruct the gunners view. The universally mounted target image projector 4 can provide aircraft target motion on the screen 3 at any position along accurate flightpaths which are predetermined or real-time computed with the perspective and size of each aircraft target being correctly related to its aspect and range at any given instant during its flight. By virtue of providing aircraft target motion over any bearing around 360° of horizon and at any elevation over at least 180° of arc, it is possible to provide overhead flight in addition to passing targets with extreme realism. For naval gunnery training in ship-to-ship roles seaborne targets can be provided at any bearings around a sensible maximum of 320°. Additionally the gun 2 may be mounted on a movable gunnery platform 7 as shown in FIG. 1, which platform 7 is movable to simulate shipboard motion. Such a platform 7 may also be utilised to simulate movement of a weapon such as a tank or self-propelled gun.

Advantageously there may be more than one target image projector 4 preferably mounted one above the other on a vertical axis through the center of curvature of the concave truncated spherical shape screen 3 for universal movement independently of one another. This enables a number of target images to be projected and controlled independently of one another thereby to improve training realism.

A visible light projector, preferably a laser projector 8 is provided located on or adjacent the target image projector 4 and operable by a firing activation of the weapon to provide a visual indication on the screen 3, by a projected beam of visible light, of at least a final portion of the flight path of the simulated fired projectile or missile, corresponding to the position at which the weapon was aimed when fired, for a projectile or missile whose trajectory or flight path cannot be controllably varied after firing, or corresponding to the position at which the weapon was aimed when fired and as subsequently controllably varied, for a projectile or missile whose trajectory or flight path can be controllably varied after firing. This laser projector 8 may be operated to indicate the whole of the projectile or missile flightpath from firing to a hit, miss, or self-destruct situation.

As shown in FIG. 1, the laser projector 8 is mounted on or separate from the target image projector 4 on the gimballed mounting 5. The apparatus is shown in conjunction with a weapon 2 in the form of a gun firing a projectile or a sequence of projectiles whose trajectory or trajectories cannot be controllably varied after firing. Means 9 for projecting a beam of radiation normally invisible to the naked eye, preferably an infra-red projector, is provided, located and operable to project a beam of radiation directly along the weapon line of sight (LOS) to form an invisible LOS spot on the screen 3. As shown in FIG. 1 this projector 9 conveniently is provided on the gun 2 itself. A detector 10 for this beam of radiation, preferably an infra-red detector, is located adjacent to the target image projector 4 on or separate from the laser projector 8 to permit movement of the detector 10 independent of the target image projector 4 and operable to track the line of sight point of the weapon on the screen 3. In the embodiment of FIG. 1 the detector 10 is mounted with and forms part of the laser projector 8.

Thus in target apparatus according to the present invention, calculation of the target image future position point anywhere along its flight path is not necessary. A chopped or modulated beam of infra-red energy is projected directly along the weapon line of sight. The resulting line of sight spot (P) on the screen 3, which spot is invisible to the naked eye, is tracked by the line of sight detector 10 at all positions on the screen 3 and at all times. When the line of sight detector 10 is positioned adjacent to and separate from the target image projector 4 it is capable of movement independent therefrom so as to permit the weapon line of sight to be tracked anywhere on the screen 3 independent of the target image position (T).

The laser projector 8 projects a beam onto the screen 3, coincident with the line of sight spot (P) produced on the screen 3 by the infra-red radiation beam projected from the projector 9 when the weapon is activated. The beam from the laser projector 8 is then deflected by an amount equal to the simulated projectile ballistic characteristics, for example fall of shot, drift and time of flight characteristics. A target hit is recorded when the beam from the laser 8 is coincident with the target image center after the correct elapsed time of flight of the projectile and target image.

Figure 2:
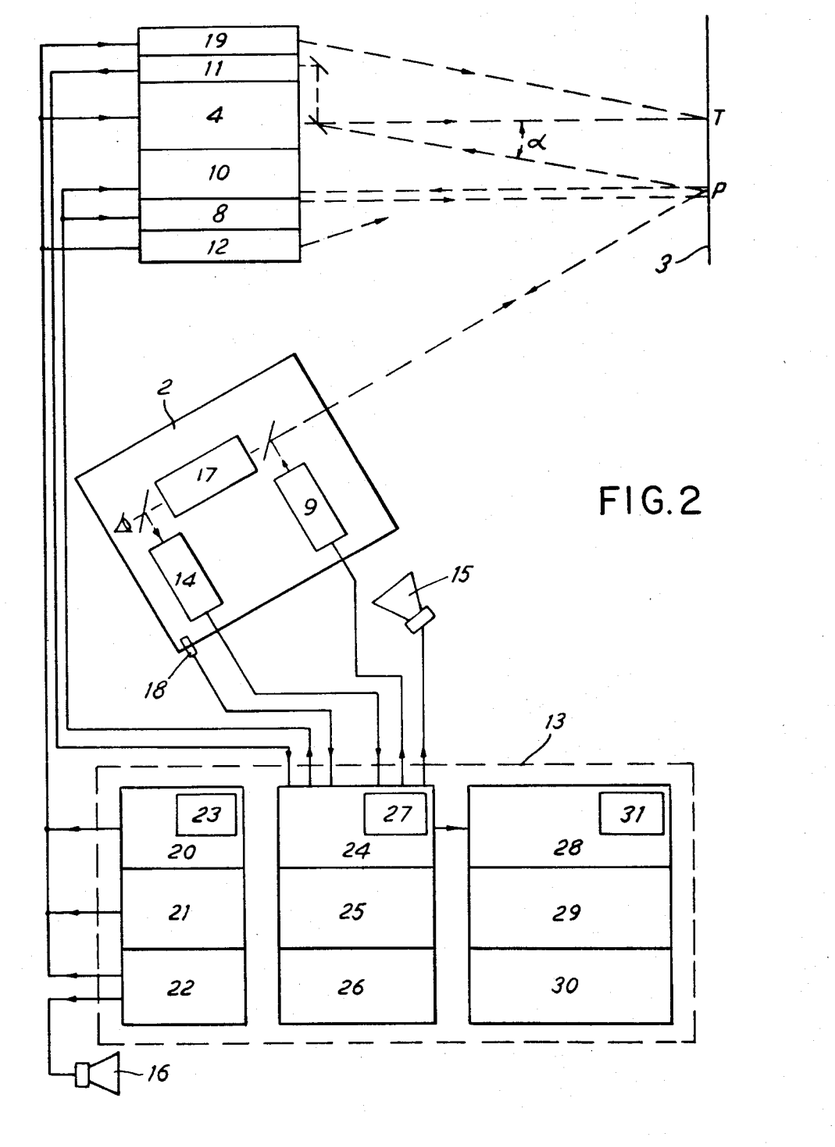
FIG. 2 is a block diagram of a projection apparatus and control system for use in the embodiment of FIG. 1.

Conveniently a miss distance detector 11 is included in the target apparatus. This detector 11 is mounted on the target image projector 4 as shown in FIGS. 1 and 2 and is operable to provide an angular measurement ($\alpha$) of the deviation on the screen 3 from the target image center of the spot provided by the beam from the laser projector 8. Optionally a target hit flash projector 12 is included preferably mounted on the target projector 4, and operable to indicate visually on the screen 3 by a beam of projected visible light, a hit or a series of hits on the target image by a flash. The target hit flash projector 12 is connected to the target image projector 4 in a manner such as to cause the latter to switch off when a hit or a series of hits are registered on the target image thereby indicating target destroyed.

Figure 3:
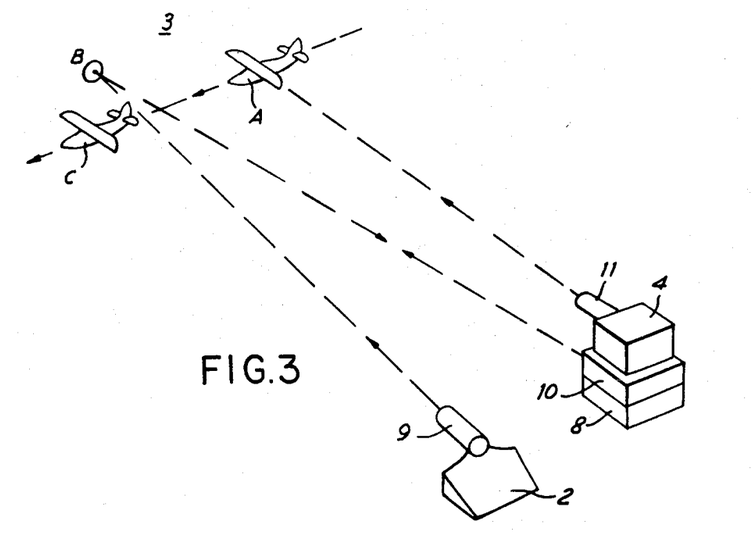
FIG. 3 is a diagrammatic indication of how the embodiment of FIGS. 1 and 2 functions to indicate visibly on the screen of the apparatus the flight path of tracer projectiles.

With the target apparatus of this embodiment of the invention it is possible to show visually on the screen 3 the flightpath of tracer bullets. The correct ballistic characteristics of the weapon producing the required tracer fire is selected on the control system shown diagrammatically in FIG. 2 with the effect that the beam from the visible light or laser projector 8 is switched on at the instant the firing sequence of the weapon is activated. The laser beam can of course be interrupted in timed sequence to provide a visible indication of the tracer path corresponding to the number of ordinary non-tracer rounds between each tracer round. As shown in FIG. 3 for an initial target image position A the beam from the laser projector 8 is aligned on the screen 3 with a spot B produced by the infra red LOS projector 9 and corresponding to the line of sight position of the weapon 2 when fired. The laser beam shows visibly on the screen the whole flightpath of the tracer round and the beam is deflected by the correct amount equal to the simulated round ballistics culminating, if the initial aim or laying of the weapon 2 was correct, in a fall of tracer onto the target image which is at the position C which it has reached by the time the round arrives at that position. A hit on the target image at C is indicated by the target flash projector 12 which projects a flash onto the target image which thereupon disappears by switching off the target image projector 4. If the weapon is incorrectly aimed when fired the flightpath of the tracer round will be shown by the beam from the laser projector 8 missing the target image at the position C and the miss distance detector 11 will record the miss distance.

The laser projector 8 may also be operated in this embodiment via a controllably movable mirror to indicate visibly on the target image the impact of a sequence or burst of projectiles such as tracer rounds. As shown generally in FIG. 4 a target image is projected along flight path line L—L by the target image projector 4. The weapon line of sight is moved along path M—M by the trainee gunner. As the weapon line of sight moves along path M—M a burst of five tracer rounds 1R, 2R, 3R, 4R, 5R is fired with the target image initially at position D when the weapon was fired. The LOS infrared projector 9 thus points at points E, F, G, H and J respectively as rounds 1R, 2R, 3R, 4R and 5R are fired. The trajectory fall of each round, for example, E to K for round 1R, is computed in real time so that at any time the laser projector 8 displays visibly on the screen 3 the position of each round.

Figure 4:
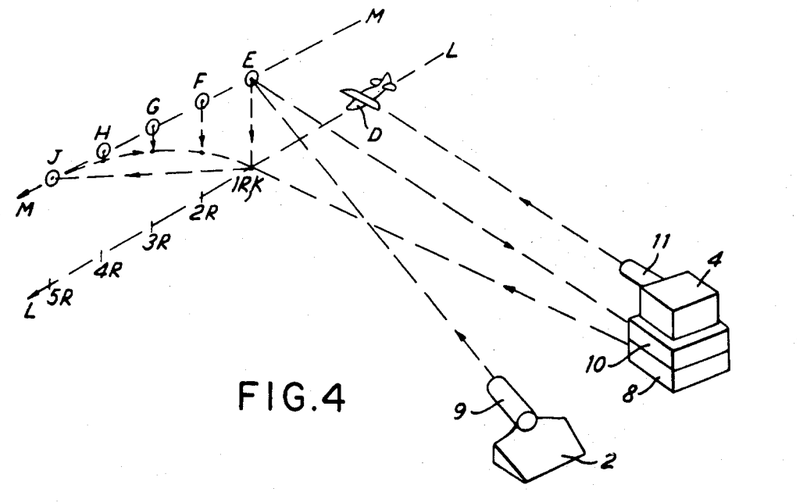
FIG. 4 is a diagrammatic view of how target apparatus according to the embodiment of FIGS. 1 and 2 functions to indicate visibly the flight path and final impact on a target image on the screen of a burst of projectiles.

To this end the scanning mirror of the laser projector 8 is made first to move to the position of the last round 5R fired and the laser switched on. The laser is then switched off and the mirror moved to the latest position of round 4R and pulsed on and so on in sequence for rounds 3R and 2R until the mirror moves to the latest position of round 1R and the laser is pulsed on. The mirror is the moved back to the next latest position of round 5R and displays that position followed sequentially by movement to the next latest positions of rounds 4R, 3R and 2R until the mirror is again pointing at the next latest position of round 1R. These movements take place at high speed and to the eye the fall of shot of the rounds appears on the screen 3 as a stream of individual spots of light falling downwards.

When round 1R was fired the weapon line of sight was at position E and the target image at position D. If the weapon 2 was aimed correctly then by the time the target image has moved to position K round 1R has fallen to position K.

When the range of the round is equal to the range of the target image the position of the laser spot on the screen 3 is compared with the position of the target image center by the miss distance detector 11. If the laser spot on the screen 3 is within the preset hit distance, taking into account the projectile dispersion characteristics of the weapon being fired, then a hit is recorded and the target flash projector 12 pulsed. if the laser spot on the screen 3 is not within the hit area then a miss is recorded and the miss distance measured by the miss distance detector 11 and recorded.

As shown in FIG. 2 the target apparatus of the invention includes various control systems for controlling and driving the gimballed mounting 5 and for allowing an instructor to monitor the weapon operator performance and control the selected weapon and projectile characteristics and target image performance. These control systems conveniently are located in a control console 13 shown in FIG. 1. As shown in FIG. 2 a gunsight T.V. camera 14 may be provided on the weapon mounting to enable a record of the gunners performance to be made for playback. Additionally the apparatus includes gun mounting trigger electrical connectors and all necessary cables for connection of the various parts of the apparatus to the weapon mounting. This equipment can be fitted to any desired type of weapon. The gunsight T.V. camera 14 permits an instructor coaxially to view the same sight picture as the weapon operator thereby allowing the instructor to monitor and correct the gunners performance. If desired supplementary optical lens may be fitted externally to the gunsight optics in order to permit high power magnification to be used to view the target image on the screen 3.

The target apparatus also includes electrical control means 20 for the target image projector 4, and control means for the laser projector 8, the line of sight infrared projector 9, the line of sight detector and tracker 10, the miss distance detector 11 and the target hit flash projector 12. The control console 13 contains the target flight or course programs on rack mounted, solid state, micro-electronic memory modules 21 triggered by means of a corresponding target video tape data coding 22 or by a real-time computation and CGI. The console 13 contains all the target projection apparatus controls, a T.V. monitor 23 which shows the target image projected, controls for the various projectors, detectors, and the cloud projector, a gunnery display unit 24, weapon control 25, exterior ballistics memories 26, weapon sight and hitmiss T.V. monitor 27, weapon recorder unit 28, video tape recorder 29, performance printout 30 and weapon sight and data presentation monitor 31.

The console 13 can be used as a gunnery control center for controlling a plurality of guns and can be operated to modify the selected program for one or more guns, rate of fire of guns, maximum range depending upon the gun characteristics and indicate actual operating sequence of gun with a visual display of a hit or a miss for subsequent analysis of performance. Sound effects may be provided to simulate gunnery noise and/or target attack noise on loudspeakers such as gun sound speaker 15 and target sound speaker 16. The line of sight infra-red projector preferably is arranged to project coaxially with the line of sight of the optical sight 17 of the weapon 2 on the target image side of the sight 17. Additionally as shown in FIG. 2 the gun sight T.V. camera 14 is arranged to view the line of sight of the weapon operator through the sight 17 and therefore is operative on the operator's side of the optical sight 17. The trigger 18 of the weapon 12 is connected to a gunnery display unit as shown in FIG. 2 which is in turn connected to a gunnery recorder unit.

The control console 13 can be operated to provide an automatic fire controlled simulation of the guns which can be interrupted at will to provide training for gun crews in changing from an automatic gun control sequence to a manually operated sequence. A fully automatic test system for the entire target apparatus may be provided. Additionally with target apparatus of the invention according to all embodiments thereof, the control console 13 can be connected to or be provided with radar target fire control means operative to pick up a target by radar while outside visual target range, track the target position on the radar and transfer or offer the target visually on the screen 3 when in range.

Target apparatus according to a second embodiment of the invention has the same basic components as those of the first embodiment, which basic components will not, therefore, be hereinafter described. FIG. 2 of the drawings shows apparatus according to the invention which is capable not only of operating as required for the first embodiment of the invention but also as required by the second and third embodiments of the invention. The target apparatus of the second embodiment, described in conjunction with FIG. 2, is applicable to a weapon in the form of a missile launcher firing a missile whose trajectory cannot be controllably varied by the operator after firing, such as a heat seeking missile. Thus the line of sight projector 9, line of sight detector 10 and miss distance detector 11 although shown in FIG. 2, are not required to be utilized in the second embodiment of the invention. In this embodiment the target apparatus additionally includes a heat projector 19 which is preferably a high powered infrared projector mounted on the target image projector 4 as shown as an optional feature in FIG. 2. The heat projector 19 projects a beam of infra-red radiation coincidentally onto the target image on the screen 3 to simulate target engine heat emission. In this way heat seeking, i.e. infra-red, missiles may track the target image by means of their infra-red detectors when they are coupled to a missile launcher. In order to improve the effectiveness of such a target apparatus the intensity of the infra-red heat beam preferably is continuously variable in accordance with the target image range and aspect. In target apparatus according to this embodiment of the invention the infra-red projector 9 and the infra-red heat projector 19 operate at different wavelengths to prevent any interference between their beams and the effect of their beams on their respective detectors.

In operation of target apparatus according to the second embodiment the laser projector 8 is switched on at the moment of simulated missile launch and indicates visually on the screen 3 the simulated flightpath of the launched missile. If the missile is launched at the correct point it will impact on the target image (T) where it will be indicated visually by the target flash projector 12 as a flash simultaneous with the switching off of the target image projector 4 to indicate target destroyed. If, however, the missile is launched at the wrong time or range, for example too early or late, the laser projector 8, which is switched on the moment the missile is launched, indicates visually on the screen 3 the simulated flightpath until the appropriate time of flight has elapsed to missile self-destruct. Missile self-destruct is shown visually by causing the laser beam spot on the screen 3 suddenly to expand in size and extinguish by switching off the projector 8.

Other missiles are known whose trajectories can be controllably varied by the operator after launching such as wire-controlled optically guided missiles. To enable operators to be trained in the use of such missiles, target apparatus according to the third embodiment of the invention is provided which is basically similar to that of the foregoing embodiments and which includes the same basic components which will not therefore be further described, for convenience. Wire-controlled optically guided missiles are visually guided by the operator from the moment of launch to impact on the target or miss the target. Accordingly there is no requirement for the heat projector 19 shown on the apparatus of FIG. 2 to be utilized, and target apparatus according to this third embodiment does not require such a heat projector. However the line of sight projector 9 and the line of sight detector 10 are required to be utilized although the miss distance detector 11 is not. Target apparatus according to this third embodiment is very similar in construction and operation to that of the preceding embodiments with the exception that at the instant of simulated missile launch the laser projector 8 is switched on and the laser spot on the screen 3 made to simulate the actual flightpath and controlled response of the missile as guided by the launcher viewing and tracking, by the weapon sight, the target image produced on the screen 3 by the target image projector 4. Missile impact on target image or missile self-destruct with target apparatus according to this third embodiment is effected in the same manner and by the same means as hereinbefore described.

We claim:

1. A target apparatus for use in the training of weapon direct fire, including a structure in which a weapon can be placed and which forms a screen of concave truncated spherical shape, a gantry located in said structure, at least one target image projector for projecting an aircraft target image onto said screen, universal mounting means supported by said gantry for mounting said at least one target image projector for universal movement substantially at the center of curvature of said spherical screen, whereby said target image projector is capable of moving the projected aircraft target image over substantially the whole of said screen, and at least one laser projector located adjacent to said target image projector, said mounting means also supporting said at least one laser projector for universal movement, said at least one laser projector being operable by a firing activation of the weapon to produce at any position over substantially the whole of the screen, by a projected laser of visible light, a visual indication on the screen of a least a final portion of the flight path of the simulated fired projectile or missile, corresponding to the position at which the weapon was aimed when fired, for a projectile or missile whose trajectory or flight path cannot be controllably varied after firing.

2. A target apparatus according to claim 1, wherein said universal mounting means is a gimballed mounting means.

3. Target apparatus according to claim 2, wherein the gimballed mounting is provided on the gantry, said gantry being fixed with respect to the structure.

4. Target apparatus according to claim 1, wherein the target image projector is a film projector.

5. Target apparatus according to claim 1, having a plurality of target image projectors.

6. Target apparatus according to claim 5, wherein the target projectors are mounted on a vertical axis through the center of curvature of the concave truncated spherical shape screen.

7. Target apparatus according to claim 1, including means for projecting a beam of radiation, normally invisible to the naked eye locatable and operable to project a beam of radiation directly along the weapon line of sight to form an invisible line of sight spot on the screen.

8. Target apparatus according to claim 7, wherein the means for projecting the beam of radiation is an infra-red projector.

9. Target apparatus according to claim 8, including a detector for the beam of radiation located adjacent the target image projector to permit movement of the detector independent of the target image projector, and operable to track the line of sight point of the weapon on the screen.

10. Target apparatus according to claim 9, including a miss distance detector located on the target image projector to provide an angular measurement of deviation of the visible light laser beam spot on the screen from the target image center on the screen.

11. Target apparatus according to claim 10, wherein the visible light laser projector is operable to indicate visibly the whole flight path of a missile or of selected projectiles in a sequence of projectiles, thus simulating tracer fire.

12. Target apparatus according to claim 11, wherein the visible light laser projector is operable via a controllably movable mirror to indicate visibly the impact of a missile or of a sequence or burst of projectiles on a target image on the screen.

13. Target image apparatus according to claim 12, including a target hit flash projector.

14. Target apparatus according to claim 13, wherein the target hit flash projector is mounted on the visible light laser projector and operable to indicate visually on the screen by a beam of projected visible light, a hit or a series of hits on the target image.

15. Target apparatus according to claim 14, wherein the target hit flash projector is connected to the target image projector in a manner such as to cause the latter to switch off when a hit or a series of hits are registered, thereby indicating destruction of the target.

16. Target apparatus according to claim 15, for a weapon in the form of a missile launcher firing a heat seeking missile whose trajectory cannot be controllably varied by the operator after firing, including a heat projector mounted on the target image projector to project a beam of infra-red radiation concidentally onto the target image on the screen to simulate target engine heat emission.

17. Target apparatus according to claim 16, wherein the heat projector is a high powered infra-red projector, with the intensity of the infra-red heat beam being continuously variable in accordance with the target image range and aspect.

18. Target apparatus according to claim 17, wherein the visible light laser projector is operable such that the visible light beam spot on the screen may be made to expand and switch off to indicate a missile self-destruction.

19. Target apparatus according to claim 1, wherein the target image projector is a TV video projector.

20. Target apparatus according to claim 1, wherein the gantry is rotatable in unison with the weapon when the latter is present in the structure and operatively transversed.

21. A target apparatus for use in the training of weapon direct fire, including a structure in which a weapon can be placed and which forms a screen of concave truncated spherical shape, a gantry located in said structure, at least one target image projector for projecting an aircraft target image onto said screen, universal mounting means supported by said gantry for mounting said at least one target image projector for universal movement substantially at the center of curvature of said spherical screen, whereby said traget image projector is capable of moving the projected aircraft target image over substantially the whole of said screen, and at least one laser projector located adjacent to said target image projector, said mounting means also supporting said at least one laser projector for universal movement, said at least one laser projector being operable by a firing activation of the weapon to produce at any position over substantially the whole of the screen, by a projected laser of visible light, a visual indication on the screen of at least a final portion of the flight path of the simulated fired projectile or missile, corresponding to the position at which the weapon was aimed when fired, and as subsequently controllably varied, for a projectile or missile whose trajectory or flight path can be controllably varied after firing.

22. A target apparatus according to claim 21, wherein said universal mounting means is a gimballed mounting means, and wherein said gantry is fixed with respect to the structure.

23. A target apparatus according to claim 21, wherein said universal mounting means is a gimballed mounting means, and wherein said gantry is rotatable in unison with a weapon when the latter is present in the structure and operatively traversed.

24. Target apparatus according to claim 21, wherein the target image projector is a film projector.

25. Target apparatus according to claim 21, wherein the target image projector is a TV video projector.

26. Target apparatus according to claim 21, having a plurality of target image projectors.

27. Target apparatus according to claim 26, wherein the target projectors are mounted on a vertical axis through the center of curvature of the concave truncated spherical shape screen.

28. Target apparatus according to claim 21, including means for projecting a beam of radiation, normally invisible to the naked eye locatable and operable to project a beam of radiation directly along the weapon line of sight to form an invisible line of sight spot on the screen.

29. Target apparatus according to claim 28, wherein the means for projecting the beam of radiation is an infra-red projector.

30. Target apparatus according to claim 29, including a detector for the beam of radiation located adjacent the target image projector to permit movement of the detector independent of the target image projector, and operable to track the line of sight point of the weapon on the screen.

31. Target apparatus according to claim 21, including a target hit flash projector.

32. Target apparatus according to claim 31, wherein the target hit flash projector is mounted on the visible light laser projector and operable to indicate visually on the screen by a beam of projected visible light, a hit or a series of hits on the target image.

33. Target apparatus according to claim 32, wherein the target hit flash projector is connected to the target image projector in a manner such as to cause the latter to switch off when a hit or series of hits are registered, thereby indicating destruction of the target.

* * * * *